US 12,434,768 B2

(12) United States Patent
Oya et al.

(10) Patent No.: US 12,434,768 B2
(45) Date of Patent: Oct. 7, 2025

(54) STEERING CONTROL DEVICE AND STEERING CONTROL METHOD

(71) Applicant: JTEKT CORPORATION, Kariya (JP)

(72) Inventors: Toshiaki Oya, Sakai (JP); Yoshinobu Shimizu, Sakai (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/716,713

(22) PCT Filed: Jan. 27, 2022

(86) PCT No.: PCT/JP2022/003082
§ 371 (c)(1),
(2) Date: Jun. 5, 2024

(87) PCT Pub. No.: WO2023/144959
PCT Pub. Date: Aug. 3, 2023

(65) Prior Publication Data
US 2025/0050945 A1 Feb. 13, 2025

(51) Int. Cl.
B62D 15/02 (2006.01)
B62D 5/00 (2006.01)
B62D 6/00 (2006.01)

(52) U.S. Cl.
CPC ......... B62D 15/0265 (2013.01); B62D 6/002 (2013.01)

(58) Field of Classification Search
CPC .......... B62D 1/286; B62D 3/12; B62D 5/008; B62D 6/002; B62D 6/003; B62D 6/008;
(Continued)

(56) References Cited

U.S. PATENT DOCUMENTS 5,086,870 A 2/1992 Bolduc
9,789,869 B2 * 10/2017 Fujita ................. B62D 15/025
(Continued)

FOREIGN PATENT DOCUMENTS

EP 3 611 076 B1 7/2021
JP H08-034353 A 2/1996
(Continued)

OTHER PUBLICATIONS

Feb. 17, 2025 Extended European Search Report issued in European Patent Application No. 22922552.9.
(Continued)

Primary Examiner — Hai H Huynh
Assistant Examiner — Johnny H Hoang
(74) Attorney, Agent, or Firm — Oliff PLC

(57) ABSTRACT

A steering control device includes an emergency determination unit configured to determine whether or not an emergency exists in which an emergency avoidance operation is to be performed, and a work adjustment unit configured to adjust work of a driver required to steer steered wheels. The work adjustment unit is configured to execute emergency adjustment processing for adjusting the work in accordance with a determination result of whether or not an emergency exists. The emergency adjustment processing includes reduction processing for reducing the work in an initial stage after the emergency determination unit determines that an emergency exists, as compared in a case in which determination is not made that an emergency exists.

20 Claims, 5 Drawing Sheets

(58) Field of Classification Search
CPC .............. B62D 15/025; B62D 15/0265; B62D 15/0285; B62D 15/0463; G05D 1/0212
USPC ...................................................... 701/41–47
See application file for complete search history.

(56) References Cited

U.S. PATENT DOCUMENTS

| | | | |
|---|---|---|---|
| 11,718,341 B2* | 8/2023 | Kunihiro | ................ B62D 1/046 701/41 |
| 2009/0312909 A1 | 12/2009 | Onuma | |
| 2012/0123642 A1* | 5/2012 | Kojo | .................... B62D 15/025 701/41 |
| 2012/0197496 A1* | 8/2012 | Limpibunterng | ...... B62D 1/286 701/42 |
| 2012/0203431 A1* | 8/2012 | Kojo | ..................... B62D 5/008 701/41 |
| 2015/0353134 A1 | 12/2015 | Morotomi et al. | |
| 2016/0280265 A1 | 9/2016 | Hass et al. | |
| 2018/0154932 A1* | 6/2018 | Rakouth | ................ B62D 1/286 |
| 2018/0304920 A1* | 10/2018 | Hirate | .................. B62D 5/0463 |
| 2019/0023318 A1* | 1/2019 | Mitsuishi | ............. B62D 5/0472 |
| 2019/0202494 A1* | 7/2019 | Itou | ...................... B62D 15/025 |
| 2021/0053613 A1 | 2/2021 | Kodera et al. | |
| 2022/0227417 A1 | 7/2022 | Suzuki | |
| 2022/0315105 A1 | 10/2022 | Kuragaki | |

FOREIGN PATENT DOCUMENTS

| | | |
|---|---|---|
| JP | 2000-177616 A | 6/2000 |
| JP | 2003-165460 A | 6/2003 |
| JP | 2004-034834 A | 2/2004 |
| JP | 2008-087533 A | 4/2008 |
| JP | 4541201 B2 | 9/2010 |
| JP | 2011-121474 A | 6/2011 |
| JP | 2015-123857 A | 7/2015 |
| JP | 2020-189531 A | 11/2020 |
| JP | 2021-030837 A | 3/2021 |
| JP | 2021-059139 A | 4/2021 |
| WO | 2020/261530 A1 | 12/2020 |

OTHER PUBLICATIONS

Mar. 29, 2022 International Search Report issued in International Patent Application No. PCT/JP2022/003082.

* cited by examiner

STEERING CONTROL DEVICE AND STEERING CONTROL METHOD

CROSS-REFERENCE TO RELATED APPLICATIONS

This application is national stage application of International Application No. PCT/JP2022/003082, filed on Jan. 27, 2022, which designates the United States, the entire contents of which is incorporated herein by reference.

TECHNICAL FIELD

The present disclosure relates to a steering control device and a steering control method.

BACKGROUND ART

Conventionally, there is a steer-by-wire steering system in which a power transmission path between an operation unit to which a steering wheel is linked and a steering unit that steers steered wheels is separated. For example, as described in Patent Document 1, a steering control device that controls such a steering system changes an angle ratio of a steered angle of the steered wheels with respect to a steering angle of the steering wheel, in accordance with traveling conditions of a vehicle.

Patent Document 2 discloses a configuration in which, in addition to or instead of a steering wheel, a joystick is employed as an operating member to be operated by a driver. In a case in which the joystick is the operating member, an amount of operation necessary to steer the steered wheels can be reduced as compared to a case in which the steering wheel is the operating member, which can improve driver convenience. Reaction torque that corresponds to the amount of operation by the driver is applied to the joystick.

RELATED ART DOCUMENTS

Patent Documents

Patent Document 1: Japanese Unexamined Patent Application Publication No. 2021-30837 (JP 2021-30837 A)
Patent Document 2: Japanese Unexamined Patent Application Publication No. 8-34353 (JP 8-34353 A)

SUMMARY OF THE INVENTION

Problem to be Solved by the Invention

A driver may perform a so-called emergency avoidance operation by quickly operating an operating member in order to avoid a collision with an obstruction that is present ahead of a vehicle, for example. It is desirable that the emergency avoidance operation be an easy operation such that steered wheels can be steered quickly.

Means for Solving the Problem

One aspect of the present disclosure provides a steering control device that controls a steering system of a vehicle. The steering system has a structure in which a power transmission path between an operation unit including an operating member and a steering unit configured to steer a steered wheel is mechanically separated. The steering control device includes a target steering corresponding value computation unit configured to compute a target steering corresponding value that is a target value of a convertible value that can be converted into a steered angle of the steered wheel, based on an amount of operation of the operating member, a steering control signal generation unit configured to generate, based on the target steering corresponding value, a steering control signal for actuation of the steering unit, an emergency determination unit configured to determine whether or not an emergency exists in which an emergency avoidance operation is to be performed, and a work adjustment unit configured to adjust work of a driver required to steer the steered wheels. The work adjustment unit is configured to execute emergency adjustment processing for adjusting the work in accordance with a determination result of whether or not an emergency exists. The emergency adjustment processing includes reduction processing for reducing the work in an initial stage after the emergency determination unit has determined that an emergency exists, as compared to a case in which determination is not made that an emergency exists.

Another aspect of the present disclosure provides a steering control method for controlling a steering system of a vehicle. The steering system has a structure in which a power transmission path between an operation unit including an operating member and a steering unit configured to steer a steered wheel is mechanically separated. The steering control method includes computing a target steering corresponding value that is a target value of a convertible value that can be converted into a steered angle of the steered wheel, based on an amount of operation of the operating member, generating, based on the target steering corresponding value, a steering control signal for actuation of the steering unit, determining whether or not an emergency exists in which an emergency avoidance operation is to be performed, and adjusting work of a driver required to steer the steered wheels. Adjusting the work includes executing emergency adjustment processing for adjusting the work in accordance with a determination result of whether or not an emergency exists. The emergency adjustment processing includes reduction processing for reducing the work in an initial stage after determination is made that an emergency exists, as compared to a case in which determination is not made that an emergency exists.

MODES FOR CARRYING OUT THE INVENTION

First Embodiment

A first embodiment of a steering control device will be described below with reference to the drawings.
(Overall Configuration)

Figure 1:
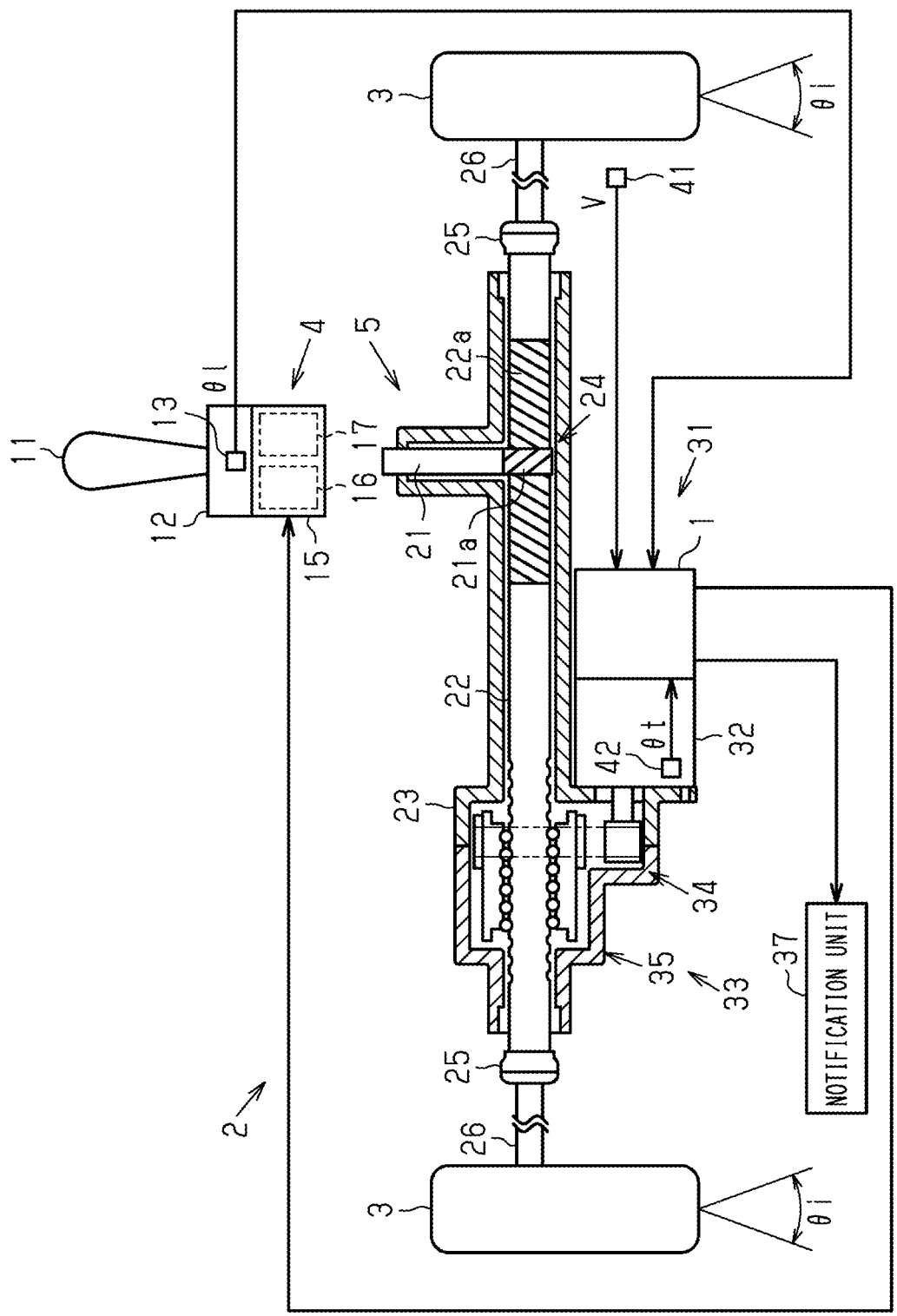
FIG. 1 is a schematic configuration diagram of a steering system and a steering control device that controls the steering system according to a first embodiment.

As shown in FIG. 1, a steering control device 1 controls a steering system 2 that is a steer-by-wire type. The steering system 2 changes a direction of travel of a vehicle by steering steered wheels 3 in accordance with operations by a driver. The steering system 2 includes an operation unit 4 that is operated by the driver, and a steering unit 5 that steers the steered wheels 3. The steering system 2 has a structure in which a power transmission path between the operation unit 4 and the steering unit 5 is mechanically separated.

The operation unit 4 includes an operating lever 11 that is an operating member operated by the driver, and a base 12 that tiltably supports the operating lever 11. The base 12 according to the present embodiment supports the operating lever 11 such that the operating lever 11 is tiltable in a lateral direction of the vehicle, i.e., in a right-left direction, and the operating lever 11 is tilted in the right-left direction by an operation by the driver. That is to say, an amount of operation by the driver is expressed by a tilt angle of the operating lever 11 (hereinafter referred to as lever tilt angle θl). In another embodiment, the base 12 may support the operating lever 11 in such a manner that the operating lever 11 is tiltable in a front-rear direction of the vehicle. The operation unit 4 is provided with a tilt angle sensor 13 that detects the lever tilt angle θl. The lever tilt angle θl is detected as a positive value when the operating lever 11 is tilted to a right direction, and as a negative value when the operating lever 11 is tilted to a left direction, but this may be reversed.

The operation unit 4 further includes an operation actuator 15 that applies an operation reaction force, which is a force countering the operation that is performed on the operating lever 11 by the driver. The operation actuator 15 according to the present embodiment includes an operating motor 16, and a link mechanism 17 that transmits rotations of the operating motor 16 to the operating lever 11. The link mechanism 17 is made up of, for example, a plurality of gears and link members. The operation actuator 15 transmits the rotations of the operating motor 16 to the link mechanism 17, and these rotations are converted by the link mechanism 17, so as to apply an operation reaction force to the operating lever 11. In another embodiment, the rotations of the operating motor 16 may be directly transmitted to the operating lever 11, and the configuration of the operation actuator 15 may be changed as appropriate.

The steering unit 5 includes a pinion shaft 21, a rack shaft 22 linked to the pinion shaft 21, a rack housing 23 that accommodates the rack shaft 22 so as to be capable of reciprocating motion, and a rack and pinion mechanism 24 that has the pinion shaft 21 and the rack shaft 22. The rack and pinion mechanism 24 is made up by meshing pinion teeth 21a formed on the pinion shaft 21, with rack teeth 22a formed on the rack shaft 22. Accordingly, the pinion shaft 21 rotates in accordance with the reciprocating motion of the rack shaft 22. Tie rods 26 are linked to both ends of the rack shaft 22 via ball joints 25. Distal ends of the tie rods 26 are linked to knuckles, omitted from illustration, with the steered wheels 3 assembled thereto.

The steering unit 5 further includes a steering actuator 31 that applies a steering force, i.e., a force for steering the steered wheels 3, to the rack shaft 22. The steering actuator 31 includes, for example, a steering motor 32 and a power transmission mechanism 33 that transmits torque of the steering motor 32 to the rack shaft 22. The power transmission mechanism 33 includes a belt mechanism 34 and a ball screw mechanism 35. The steering actuator 31 transmits rotations of the steering motor 32 to the ball screw mechanism 35 via the belt mechanism 34, and the ball screw mechanism 35 performs conversion thereof into reciprocating motion of the rack shaft 22, thereby applying steering force to the steered wheels 3.

In the steering system 2 configured as described above, the steering force is applied from the steering actuator 31, in accordance with operations performed by the driver on the operating lever 11. Thus, the rack shaft 22 exhibits reciprocating motion, and a steered angle θi of the steered wheels 3 is changed. That is to say, the steering actuator 31 steers the steered wheels 3 in accordance with driver operations. At this time, the operation actuator 15 applies the operation reaction force to the operating lever 11. That is to say, in the steering system 2, the force required for the driver to operate the operating lever 11 is changed by the operation reaction force applied by the operation actuator 15.

The steering control device 1 is connected to the operating motor 16 and the steering motor 32, and controls actuation of the operating motor 16 and the steering motor 32. Also, the steering control device 1 is connected to a notification unit 37 and controls actuation of the notification unit 37. The notification unit 37 may be any device that outputs a physical quantity that the driver can recognize by the five senses, such as a display panel, a speaker, or the like.

Detection results from various sensors are input to the steering control device 1. The various sensors include, for example, the tilt angle sensor 13, a vehicle speed sensor 41, and a rotation angle sensor 42. The vehicle speed sensor 41 detects a vehicle speed V that is a traveling speed of the vehicle. The rotation angle sensor 42 detects a rotation angle θt of a rotary shaft of the steering motor 32 as a relative angle within a range of 360°. Detection results of these sensors are examples of state variables. The steering control device 1 controls actuation of the operating motor 16, the steering motor 32, and the notification unit 37, based on the input state variables.
(Steering Control Device 1)

Figure 2:
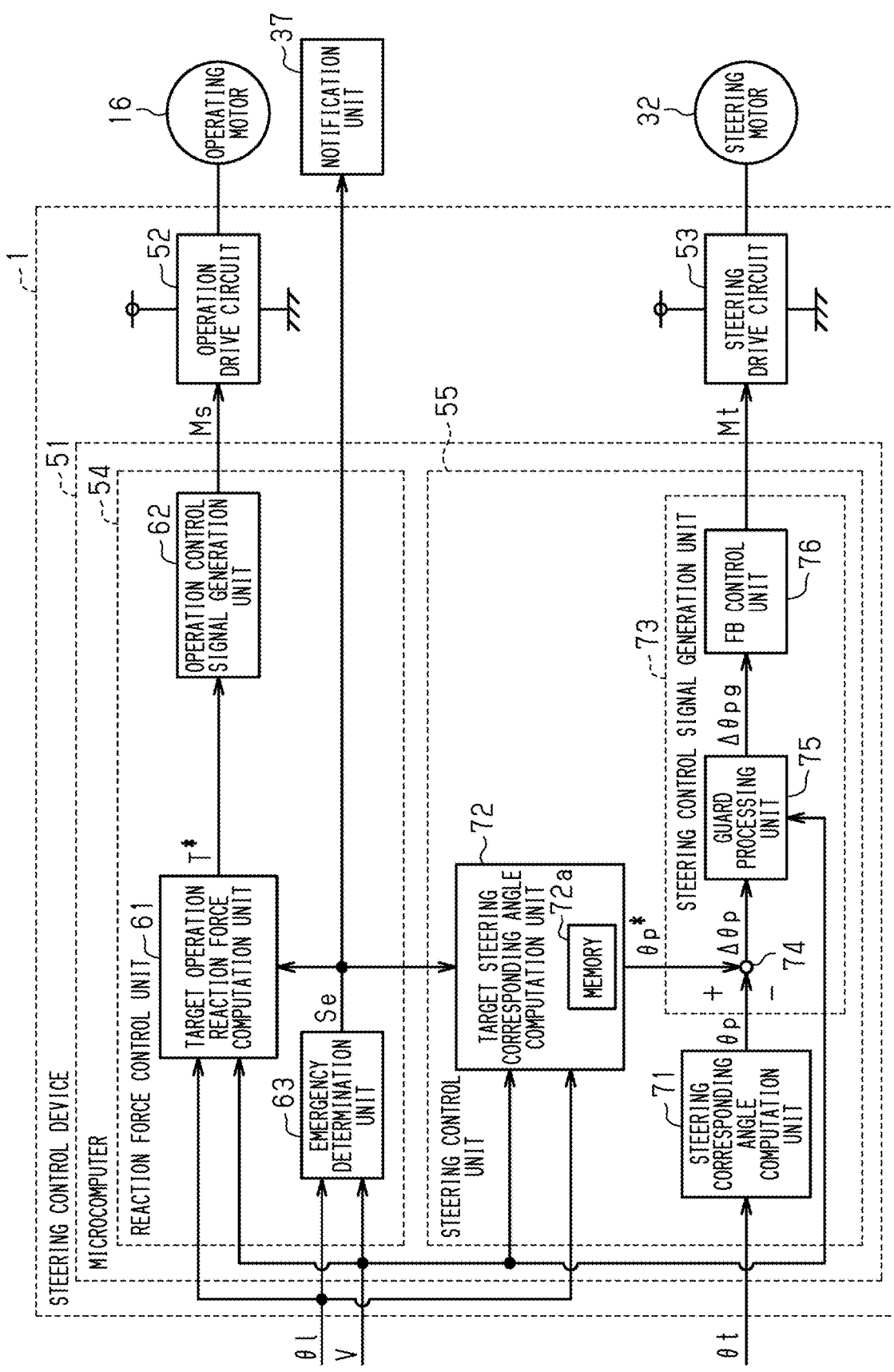
FIG. 2 is a block diagram of the steering control device in FIG. 1.

A configuration of the steering control device 1 will be described in detail below. As illustrated in FIG. 2, the steering control device 1 includes a microcomputer 51, an operation drive circuit 52, and a steering drive circuit 53. The microcomputer 51 outputs an operation control signal Ms and a steering control signal Mt. The operation drive circuit 52 supplies electric power to the operating motor 16 based on the operation control signal Ms, and the steering drive circuit 53 supplies electric power to the steering motor 32 based on the steering control signal Mt.

The microcomputer 51, which is a processing circuit, can be made up of (1) one or more processors that operate in accordance with a computer program (software), (2) one or more dedicated hardware circuits, such as an application-specific integrated circuit (ASIC) that executes at least part of processing out of various types of processing, or the like, or (3) a combination thereof. The processor includes a CPU and memory such as RAM, ROM, and so forth, and the memory stores program codes or commands configured to cause the CPU to execute processing. The memory, which is non-transitory computer-readable media, includes any usable media that can be accessed by a general-purpose or dedicated computer. Various types of control by the microcomputer 51 are executed by the CPU executing programs stored in the memory at each predetermined computation cycle.

A typical PWM inverter including a plurality of switching devices such as FETs, IGBTs, or the like, for example, is employed as the operation drive circuit 52 and the steering drive circuit 53. The operation control signal Ms and the steering control signal Mt are gate on/off signals that define on/off states of the switching elements.

Electric power corresponding to the operation control signal Ms is supplied to the operating motor 16 from an in-vehicle power supply, by the microcomputer 51 outputting the operation control signal Ms to the operation drive circuit 52. This causes the operating motor 16 to rotate, and the operation reaction force is applied to the operating lever 11 as described above. In this way, the steering control device 1 controls motor torque generated by the operating motor 16 through the supply of electric power to the operating motor 16, and applies the operation reaction force to the operating lever 11. Also, electric power corresponding to the steering control signal Mt is supplied to the steering motor 32 from the in-vehicle power supply, by the microcomputer 51 outputting the steering control signal Mt to the steering drive circuit 53. As a result, the steering motor 32 rotates, and the steering force is applied to the steered wheels 3 as described above. In this way, the steering control device 1 controls motor torque generated by the steering motor 32, through the supply of electric power to the steering motor 32, thereby causing the steered wheels 3 to be steered.

(Microcomputer 51)

The microcomputer 51 outputs the operation control signal Ms and the steering control signal Mt by the control blocks described below executing computation processing at a predetermined computing cycle. The vehicle speed V, the lever tilt angle θl, and the rotation angle θt are input to the microcomputer 51. The microcomputer 51 generates and outputs the operation control signal Ms and the steering control signal Mt based on these state variables. The microcomputer 51 includes a reaction force control unit 54 that generates the operation control signal Ms, and a steering control unit 55 that generates the steering control signal Mt.

(Reaction Force Control Unit 54)

The reaction force control unit 54 includes a target operation reaction force computation unit 61 that computes a target operation reaction force T*, an operation control signal generation unit 62 that generates the operation control signal Ms, and an emergency determination unit 63 that outputs an emergency state signal Se that indicates whether or not an emergency exists in which an emergency avoidance operation is to be performed.

The emergency determination unit 63 receives the vehicle speed V and the lever tilt angle θl. The emergency determination unit 63 executes emergency determination for determining whether or not an emergency exists, and completion determination for determining whether or not an emergency avoidance operation has been completed, based on these state variables. The emergency avoidance operation refers to quickly operating the operating lever 11 in order to avoid a collision with an obstruction that is present ahead of the vehicle, for example.

The emergency determination unit 63 has an emergency flag F. The emergency flag F indicates that an emergency exists in which an emergency avoidance operation is necessary, in a case in which a value thereof is "1", and indicates that no emergency exists in which an emergency avoidance operation is necessary in a case in which the value thereof is "0". The emergency state signal Se is a signal that indicates the value of the emergency flag F. The emergency determination unit 63 changes the value of the emergency flag F depending on the results of the emergency determination and the completion determination. The emergency determination unit 63 then outputs the emergency state signal Se to the target operation reaction force computation unit 61, the steering control unit 55, and the notification unit 37. Note that the emergency state signal Se indicating that the value of the emergency flag F is "1" is configured to cause the notification unit 37 to perform a notification operation that an emergency exists. Emergency determination and completion determination will be described later.

The target operation reaction force computation unit 61 receives the vehicle speed V, the lever tilt angle θl, and the emergency state signal Se. The target operation reaction force computation unit 61 computes the target reaction force T*, which is a target value of the operation reaction force, based on these state variables, and performs output thereof to the operation control signal generation unit 62. Computation of the target operation reaction force T* will be described later.

The operation control signal generation unit 62 generates the operation control signal Ms based on the target operation reaction force T*. The operation control signal generation unit 62 uses an optional known technology to generate the operation control signal Ms that causes the operating motor 16 to generate torque corresponding to the target operation reaction force T*.

(Steering Control Unit 55)

The steering control unit 55 includes a steering corresponding angle computation unit 71 that computes a steering corresponding angle θp, a target steering corresponding angle computation unit 72 that computes a target steering corresponding angle θp*, and a steering control signal generation unit 73 that generates the steering control signal Mt.

The rotation angle θt of the steering motor 32 is input to the steering corresponding angle computation unit 71. The steering corresponding angle computation unit 71 computes an integrated angle by counting the number of rotations of the steering motor 32 from, for example, a midpoint and integrating the rotational angle θt with the midpoint as zero degrees. The steering corresponding angle computation unit 71 then computes a steering corresponding angle θp by multiplying this integrated angle by a conversion factor based on a reduction ratio of the belt mechanism 34, a lead of the ball screw mechanism 35, and a rotational speed ratio of the rack and pinion mechanism 24. That is to say, the steering corresponding angle θp corresponds to a pinion angle that is a rotation angle of the pinion shaft 21, and the midpoint is the rotation angle of the pinion shaft 21 when the vehicle travels straight. As described above, the pinion shaft 21 rotates in accordance with the reciprocating motion of the rack shaft 22, and accordingly, the rotation angle of the pinion shaft 21, i.e., the steering corresponding angle θp, corresponds to a steering corresponding value that is an actual value of a convertible value that can be converted into the steered angle θi of the steered wheels 3, and the steering corresponding angle computation unit 71 corresponds to a steering corresponding value computation unit. The steering corresponding angle θp computed by the steering corresponding angle computation unit 71 is output to the steering control signal generation unit 73.

The target steering corresponding angle computation unit 72 receives the vehicle speed V, the lever tilt angle θl, and the emergency state signal Se. The target steering corresponding angle computation unit 72 computes the target steering corresponding angle θp*, which is a target value of the steering corresponding angle θp, based on these state variables. That is to say, the target steering corresponding angle θp* is equivalent to a target steering corresponding value that is a target value of convertible values that can be converted into the steered angle θi of the steered wheels 3, and the target steering corresponding angle computation unit 72 is equivalent to a target steering corresponding value computation unit. The computation processing for computing the target steering corresponding angle θp* by the target steering corresponding angle computation unit 72 will be described later. The target steering corresponding angle θp* is output to the steering control signal generation unit 73.

The steering corresponding angle θp and the target steering corresponding angle θp* are input to the steering control signal generation unit 73. The steering control signal generation unit 73 according to the present embodiment generates the steering control signal Mt based on these state quantities, so as to gradually reflect the change in the target steering corresponding angle θp* in the steered angle θi.

Specifically, the steering control signal generation unit 73 includes a subtractor 74, a guard processing unit 75, and a feedback control unit 76. Note that hereinafter, the term "feedback" may be written as "FB".

The steering corresponding angle θp and the target steering corresponding angle θp* are input to the subtractor 74. The subtractor 74 computes a difference Δθp by subtracting the steering corresponding angle θp from the target steering corresponding angle θp*. The difference Δθp is output to the guard processing unit 75.

The difference Δθp is input to the guard processing unit 75. The guard processing unit 75 computes a difference Δθpg, by limiting the difference 40p to no greater than a difference upper-limit value Δθlim. The difference upper-limit value Δθlim is a value that corresponds to an upper limit speed of a steering speed of the steered wheels 3. The guard processing unit 75 according to the present embodiment computes the difference upper-limit value Δθlim based on the vehicle speed V, but the difference upper-limit value Δθlim may be a fixed value that is set in advance. For example, the guard processing unit 75 has a map or a function that indicates a relation between the vehicle speed V and the difference upper-limit value Δθlim, and computes the difference upper-limit value Δθlim in accordance with the vehicle speed V by referencing the map or the function.

The guard processing unit 75 performs comparison of magnitude between the absolute value of the difference Δθp that is input and the upper-limit value Δθlim of the difference that is computed. In a case in which the absolute value of the difference Δθp is no greater than the difference upper-limit value Δθlim, the guard processing unit 75 outputs the difference Δθp that is input, without change, to the FB control unit 76 as the difference Δθpg following guard processing. On the other hand, in a case in which the absolute value of the difference Δθp is greater than the difference upper-limit value Δθlim, the guard processing unit 75 maintains the sign of the difference Δθp that is input, and also outputs a value, of which the absolute value is equal to the difference upper-limit value Δθlim, to the FB control unit 76 as the difference Δθpg following guard processing.

The difference Δθpg following guard processing is input to the FB control unit 76. The FB control unit 76 computes a target steering torque by executing FB computation based on the difference Δθpg. As an example, PID control computation is employed for FB computation, but this is not restrictive, and PI control computation or the like may be used. The FB control unit 76 then generates a steering control signal Mt using an optional known technology so as to cause the steering motor 32 to generate the target steering torque.

As described above, the difference Δθpg used in the FB computation is limited to no greater than the difference upper-limit value Δθlim in accordance with the upper-limit speed. Accordingly, when electric power is supplied from the steering drive circuit 53 to the steering motor 32 in accordance with the steering control signal Mt, the steered wheels 3 are steered to the steered angle θi in accordance with the target steering corresponding angle θp*, at a steering speed no greater than the upper-limit speed. In other words, the steering control signal generation unit 73 generates the steering control signal Mt so as to gradually reflect the change in the target steering corresponding angle θp* in the steered angle θi by setting the steering speed of the steered wheels 3 to be no greater than the upper limit speed.

(Emergency Determination Unit 63)

Next, the emergency determination and the completion determination performed by the emergency determination unit 63 will be described in detail.

When the value of the emergency flag F is "0", i.e., a case where an emergency in which an emergency avoidance operation is performed does not exist, the emergency determination unit 63 executes emergency determination based on the vehicle speed V and the lever tilt angle θl. Also, when the value of the emergency flag F is "1", i.e., a case in which an emergency exists, completion determination is made based on the lever tilt angle θl. The emergency determination unit 63 then changes the value of the emergency flag F in accordance with the result of executing the emergency determination or the completion determination, and outputs an emergency state signal Se indicating the value of the emergency flag F.

(Emergency Determination)

The emergency determination unit 63 determines that an emergency exists in a case in which all of the following conditions (a1) to (a3) are met.

(a1) The vehicle speed V is no lower than a high-speed determination threshold value Vth.

(a2) An absolute value of the lever tilt angle θl is smaller than a turning determination threshold value θlth.

(a3) An absolute value of an operating speed ωl of the operating lever 11 is no lower than a rapid operation determination threshold value ωlth.

Note that the high-speed determination threshold value Vth is a vehicle speed V at which determination can be made that the vehicle is traveling at a relatively high speed, and this value is set in advance. The turning determination threshold value θlth is a lever tilt angle θl at which determination can be made that the vehicle is not turning pronouncedly, i.e., that the vehicle is traveling generally straight, and this value is set in advance. The rapid operation determination threshold value ωlth is an operation speed ωl at which determination can be made that the driver is performing a quick operation, and this value is set in advance. The emergency determination unit 63 according to the present embodiment computes the operation speed ωl by differentiation of the lever tilt angle θl. In another embodiment, the operation unit 4 may be configured including a speed sensor, with the operating speed ωl being input from the speed sensor. The operation speed ωl is detected as a positive value when the operating lever 11 is tilted to the right direction and as a negative value when the operating lever 11 is tilted to the left direction, but this may be reversed. The emergency determination is executed based on the result of comparison of magnitude between a parameter indicating the traveling state of the vehicle and a threshold value as in (a1) above, and the result of comparison of magnitude between a parameter indicating the operation state of the operation unit 4 and a threshold value as in (a2) and (a3) above.

The emergency determination unit 63 sets the value of the emergency flag F to "1" in a case in which all of the conditions (a1) to (a3) are met. Also, in a case in which all of the conditions (a1) to (a3) are met, the emergency determination unit 63 according to the present embodiment determines and stores the operation direction of the operating lever 11 in the emergency avoidance operation based on the sign of the operating speed ol. On the other hand, the emergency determination unit 63 does not change the value of the emergency flag F in a case in which at least one of the conditions (a1) to (a3) is not met.

Next, an example of processing procedures for emergency determination performed by the emergency determination unit 63 will be described with reference to the flowchart shown in FIG. 3.

Figure 3:
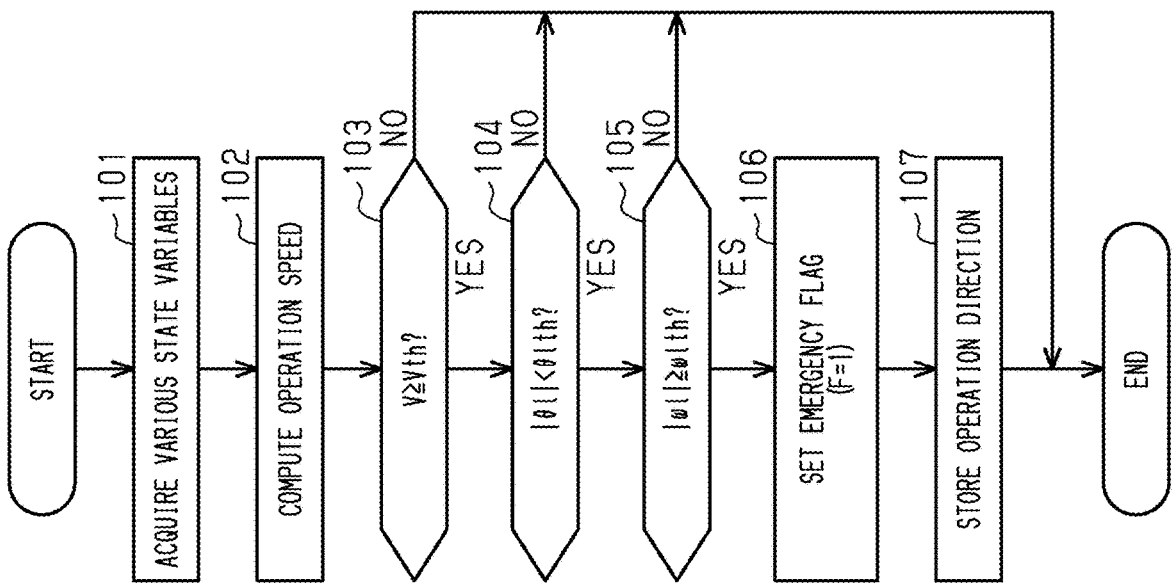
FIG. 3 is a flowchart showing an example of processing procedures for emergency determination by an emergency determination unit in FIG. 2.

As shown in FIG. 3, upon acquiring various state variables (step 101), the emergency determination unit 63 computes the operation speed ωl (step 102) and determines whether or not the vehicle speed V is no lower than the high-speed determination threshold value Vth (step 103). In a case in which the vehicle speed V is no lower than the high-speed determination threshold value Vth (YES in step 103), determination is made regarding whether or not the absolute value of the lever tilt angle θl is smaller than the turning determination threshold value θlth (step 104). In a case in which the absolute value of the lever tilt angle θl is smaller than the turning determination threshold value θlth (YES in step 104), determination is made regarding whether or not the absolute value of the operating speed ωl of the operating lever 11 is no smaller than the rapid operation determination threshold value ωlth (step 105).

In a case in which the absolute value of the operating speed ωl of the operating lever 11 is no smaller than the rapid operation determination threshold value ωlth (YES in step 105), the emergency determination unit 63 sets the value of the emergency flag F to "1" (step 106). Next, the operation direction of the operating lever 11 in the emergency avoidance operation is determined and stored (step 107). Thereafter, this processing ends.

On the other hand, in a case in which the vehicle speed V is lower than the high-speed determination threshold value Vth (NO in step 103), the emergency determination unit 63 does not set the value of the emergency flag F to "1", and ends this processing. Similarly, in a case in which the absolute value of the lever tilt angle θl is no smaller than the turning determination threshold value θlth (NO in step 104), and the absolute value of the operating speed ωl of the operating lever 11 is smaller than the rapid operation determination threshold value ωlth (NO in step 105), this processing ends without the value of the emergency flag F being set to "1".

(Completion Determination)

The emergency determination unit 63 determines that the emergency avoidance operation has been completed in a case in which the following condition (b1) is met.

(b1) The operating lever 11 is operated in a return direction that is opposite to the operation direction thereof in the emergency avoidance operation.

The emergency determination unit 63 determines whether or not an operation in the returning direction from the emergency avoidance operation has been performed, based on the sign of the operation speed ωl. Specifically, the emergency determination unit 63 computes the operation speed ωl based on the lever tilt angle θl, and detects the current operation direction based on the sign of this operation speed ωl. In a case in which the operation direction that is detected is opposite to the operation direction of the emergency avoidance operation that is stored, determination is made that an operation in the return direction has been performed. In a case in which the condition of (b1) is met, the emergency determination unit 63 resets the value of the emergency flag F to "0." Also, in a case in which determination is made that an operation in the return direction has been performed, the emergency determination unit 63 deletes the operation direction of the emergency avoidance operation that is stored. On the other hand, in a case in which the condition (b1) is not met, the emergency determination unit 63 does not change the value of the emergency flag F, and does not delete the operation direction that was stored.

Next, an example of processing procedures for completion determination performed by the emergency determination unit 63 will be described with reference to the flowchart shown in FIG. 4.

Figure 4:
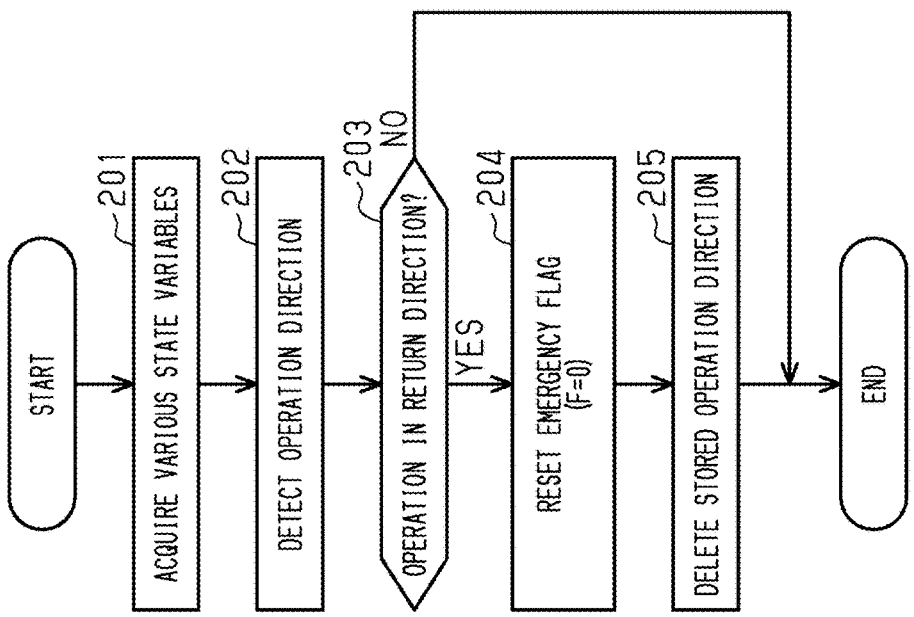
FIG. 4 is a flowchart showing an example of processing procedures for completion determination by the emergency determination unit in FIG. 2.

As shown in FIG. 4, upon acquiring various state variables (step 201), the emergency determination unit 63 computes the operation speed ωl and detects the current operation direction of the operating lever 11 based on the sign of this operation speed ωl (step 202). Next, determination is made regarding whether or not the current operation direction is opposite to the operation direction of the emergency avoidance operation, i.e., whether or not an operation in the return direction is being performed (step 203).

In a case in which a return direction operation is being performed (YES in step 203), the emergency determination unit 63 resets the value of the emergency flag F to "O" (step 204). Next, the operation direction of the emergency avoidance operation that is stored is deleted (step 205), and this processing ends. On the other hand, in a case in which a return direction operation is not being performed (NO in step 203), the emergency determination unit 63 ends this processing without resetting the value of the emergency flag F to "0".

(Target Operation Reaction Force Computation Unit 61)

Next, computation of the target operation reaction force T* by the target operation reaction force computation unit 61 illustrated in FIG. 2 will be described in detail.

The target operation reaction force computation unit 61 first computes a basic operation reaction force Tb. The basic operation reaction force Tb is then adjusted in accordance with the value of the emergency flag F to compute the target operation reaction force T*.

Specifically, the target operation reaction force computation unit 61 computes an angular axial force as a basic operation reaction force Tb. The angular axial force is a road reaction force that is considered to be applied to the steered wheels 3 from the road surface, and is an ideal value defined by an optionally set vehicle model. The angular axial force is an axial force that does not reflect road surface information. Road surface information includes information regarding minute asperities that do not affect lateral behavior of the vehicle, stepped formations that affect the lateral behavior of the vehicle, and so forth. The angular axial force is computed such that, for example, the greater the absolute value of the lever tilt angle θl is, the greater the absolute value of the angular axial force is. Further, the angular axial force is computed such that, for example, the greater the vehicle speed V is, the greater the absolute value of the angular axial force is.

The target operation reaction force computation unit 61 multiplies the basic operation reaction force Tb by a gain G to adjust the basic operation reaction force Tb. The target operation reaction force computation unit 61 changes the gain G in accordance with the value of the emergency flag F and elapsed time t since determination was made that an emergency exists. The target operation reaction force computation unit 61 has a timer that is omitted from illustration, and measures the elapsed time t after the value of the emergency flag F is changed from "0" to "1".

More specifically, in a case in which the value of the emergency flag F is "0", i.e., when determination is made that an emergency does not exist, the target operation reaction force computation unit 61 sets the gain G to normal gain Gn. The normal gain Gn is, for example, "1", but may be set to any value greater than zero.

In a case in which the value of the emergency flag F is "1" and the elapsed time t since determination was made that an emergency exists is less than a predetermined time tth, the target operation reaction force computation unit 61 computes an initial gain Gi based on the vehicle speed V, and sets the gain G to the initial gain Gi. The initial gain Gi is computed to be a value greater than zero and smaller than the normal gain Gn. For example, the initial gain Gi is computed to have a greater value the higher the vehicle speed V is, but may also be computed to have a smaller value the higher the vehicle speed Vis.

In a case in which the value of the emergency flag F is "1" and the elapsed time t since determination was made that an emergency exists is no less than the predetermined time tth, the target operation reaction force computation unit 61 computes a latter gain Gl based on the vehicle speed V, and sets the gain G to the latter gain Gl. The latter gain Gl is computed to be a value that is no less than the normal gain Gn. For example, the latter gain Gl is computed to have a greater value the higher the vehicle speed V is, but may also be computed to have a smaller value the higher the vehicle speed Vis.

The predetermined time tth is set in advance based on the stage of avoidance by the emergency avoidance operation. Stages of avoidance are divided into an initial stage in which the steered wheels 3 are steered to avoid a collision with an obstruction, for example, and a latter stage in which further steering of the steered wheels 3 is unnecessary. The predetermined time tth is set in advance based on the amount of time required to transition from the initial stage to the latter stage, and may be around 0.3 seconds, for example.

The target operation reaction force computation unit 61 computes the target operation reaction force T* by multiplying the basic operation reaction force Tb by the gain G thus set. That is to say, in the initial stage, the target operation reaction force computation unit 61 computes a target operation reaction force T* having a smaller absolute value as compared to a case in which determination is not made that an emergency exists. Then, in the latter stage, the target operation reaction force computation unit 61 computes a target operation reaction force T* having an absolute value no less than the target operation reaction force T* in a case in which determination is not made that an emergency exists. Thus, when determination is made that an emergency exists, the target operation reaction force T* is first computed to be smaller, and then computed to be greater again.

Now, the work required for the driver to steer the steered wheels 3 is expressed as the product of the force resisting the operation reaction force and the amount of change in the lever tilt angle θl. Accordingly, the target operation reaction force computation unit 61 reduces the work required to steer the steered wheels 3 by reducing the operation reaction force in the initial stage. That is to say, the target operation reaction force computation unit 61 corresponds to a work adjustment unit, and executes emergency adjustment processing. The emergency adjustment processing includes reduction processing that includes reducing target operation reaction force computation processing, and weighting processing.

As described above, after determination is made that an emergency exists and accordingly the value of the emergency flag F becomes "1", the gain G is changed to the initial gain Gi or the latter gain Gl, thereby executing emergency adjustment processing. This emergency adjustment processing is stopped by changing the gain G to the normal gain Gn after the value of the emergency flag F becomes "0" due to determination being made that the emergency avoidance operation has been completed.

Next, an example of processing procedures in which the target operation reaction force computation unit 61 computes the target operation reaction force T* will be described with reference to the flowchart shown in FIG. 5.

Figure 5:
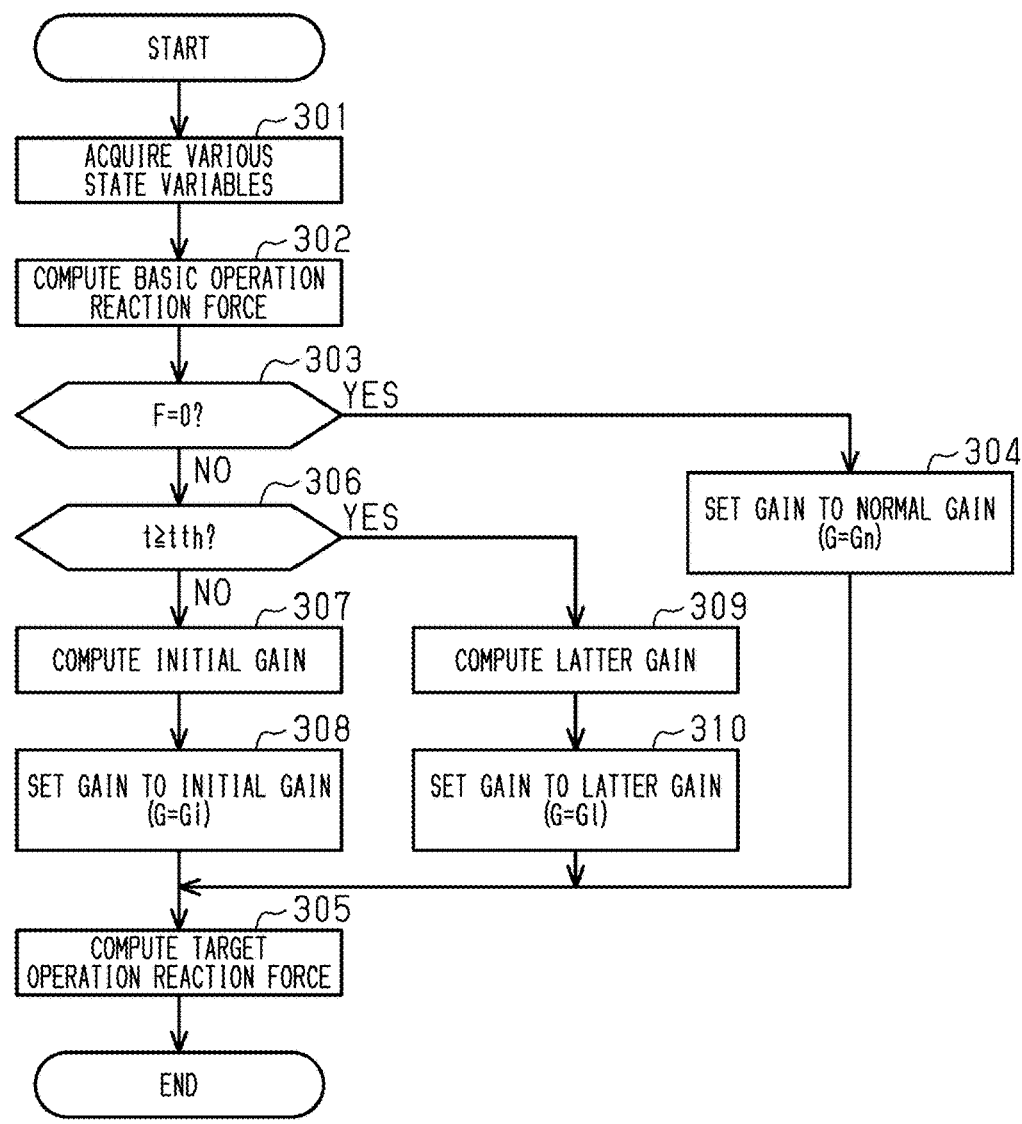
FIG. 5 is a flowchart showing an example of processing procedures for target operation reaction force computation by a target operation reaction force computation unit in FIG. 2.

As shown in FIG. 5, upon acquiring various state variables (step 301), the target operation reaction force computation unit 61 computes the basic operation reaction force Tb (step 302). Next, determination is made regarding whether or not the value of the emergency flag F is "0" (step 303). In a case in which the value of the emergency flag F is "0" (YES in step 303), the gain G is set to the normal gain Gn (step 304), and the target operation reaction force T* is computed using the normal gain Gn (step 305).

On the other hand, in a case in which the value of the emergency flag F is "1" (NO in step 303), the target operation reaction force computation unit 61 determines whether or not the elapsed time t since determination was made that an emergency exists is no less than the predetermined time tth (step 306). In a case in which the elapsed time t is less than the predetermined time tth (NO in step 306), the initial gain Gi is computed based on the vehicle speed V (step 307). Next, the gain G is set to the initial gain Gi (step 308), and the processing transitions to step 305 in which the target operation reaction force T* is computed using the initial gain Gi. The processing in steps 305, 307, and 308 corresponds to the reduction processing and the reducing target operation reaction force computation processing.

In a case in which the elapsed time t is no less than the predetermined time tth (YES in step 306), the target operation reaction force computation unit 61 computes the latter gain Gl based on the vehicle speed V (step 309). Next, the gain G is set to the latter gain Gl (step 310), and the processing transitions to step 305 in which the target operation reaction force T* is computed using the latter gain Gl. The processing in steps 305, 309, and 310 corresponds to the weighting processing. Also, the processing in steps 305 to 310 corresponds to emergency adjustment processing.

(Target Steering Corresponding Angle Computation Unit 72)

Next, the computation of the target steering corresponding angle θp* by the target steering corresponding angle computation unit 72 illustrated in FIG. 2 will be described.

The target steering corresponding angle computation unit 72 includes memory 72a. The memory 72a stores a normal map 81, which is normal computation information, and an emergency map 82, which is emergency computation information.

Figure 6:
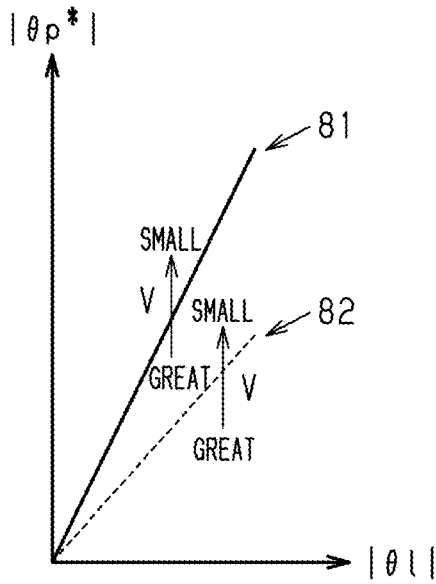
FIG. 6 is a diagram showing an example of a normal map and an emergency map that a target steering corresponding angle computation unit in FIG. 2 has.

As shown in FIG. 6, the normal map 81 and the emergency map 82 show a relation among the lever tilt angle θl, the vehicle speed V, and the target steering corresponding angle θp*. That is to say, the normal map 81 and the emergency map 82 are three-dimensional maps showing the relation of the target steering corresponding angle θp* as to the lever tilt angle θl and the vehicle speed V. In FIG. 6, the normal map 81 is indicated by a continuous line, and the emergency map 82 is indicated by a dashed line.

In the example that is shown, in both the normal map 81 and the emergency map 82, in a case in which the lever tilt angle θl is zero degrees, the target steering corresponding angle θp* is zero degrees. Both the normal map 81 and the emergency map 82 are set such that the greater the absolute value of the lever tilt angle θl is, the greater the absolute value of the target steering corresponding angle θp* is. The absolute value of the target steering corresponding angle θp* increases linearly based on the increase in the absolute value of the lever tilt angle θl. That is to say, an angle ratio α of the steered angle θi of the steered wheels 3 to the lever tilt angle θl of the operating lever 11 does not change in accordance with the absolute value of the lever tilt angle θl. However, in another embodiment, the absolute value of the target steering corresponding angle θp* may increase non-linearly, for example, based on an increase in the absolute value of the lever tilt angle θl. That is to say, the angle ratio α may change in accordance with the absolute value of the lever tilt angle θl. The angle ratio α is a value obtained by dividing the steered angle θi by the lever tilt angle θl (α=θi/θl).

Also, both the normal map 81 and the emergency map 82 are set so that, for example, the smaller the vehicle speed V is, the greater the absolute value of the target steering corresponding angle θp* is. That is to say, the angle ratio α changes in accordance with the vehicle speed V. The amount of change in the absolute value of the target steering corresponding angle θp* with respect to the amounts of change in the lever tilt angle θl and the vehicle speed V in the emergency map 82 is set to be smaller than the amount of change in the absolute value of the target steering corresponding angle θp* with respect to the amounts of change in the lever tilt angle θl and the vehicle speed V in the normal map 81. Accordingly, the absolute value of the target steering corresponding angle θp* in the emergency map 82 is smaller than the absolute value of the target steering corresponding angle θp* in the normal map 81, at any lever tilt angle θl and vehicle speed V, except for in a case in which the absolute value of the target steering corresponding angle θp* in the normal map 81 is zero.

In a case in which the value of the emergency flag F is "0", the target steering corresponding angle computation unit 72 computes the target steering corresponding angle θp* in accordance with the lever tilt angle θl and the vehicle speed V, by referencing the normal map 81. On the other hand, in a case in which the value of the emergency flag F is "1", the target steering corresponding angle computation unit 72 computes the target steering corresponding angle θp* in accordance with the lever tilt angle θl and the vehicle speed V, by referencing the emergency map 82. That is to say, the target steering corresponding angle computation unit 72 switches the map depending on whether a case in which determination is made that an emergency exists or a case in which determination is not made that an emergency exists. Thus, in a case in which determination is made that an emergency exists, the target steering corresponding angle computation unit 72 computes a target steering corresponding angle θp* having an absolute value that is smaller than the target steering corresponding angle θp* in a case in which determination is not made that an emergency exists. That is to say, after determination is made that an emergency exists, the target steering corresponding angle θp* becomes less likely to change in response to change in the lever tilt angle θl caused by driver operations.

As described above, the work required for the driver to steer the steered wheels 3 is expressed as the product of the force resisting the operation reaction force and the amount of change in the lever tilt angle θl. Accordingly, the target steering corresponding angle computation unit 72 increases the work required to steer the steered wheels 3 by increasing the amount of change in the lever tilt angle θl required to steer the steered wheels 3. That is to say, the target steering corresponding angle computation unit 72 corresponds to a work adjustment unit, and executes emergency adjustment processing. The emergency adjustment processing includes suppressing target steering corresponding value computation processing.

Figure 7:
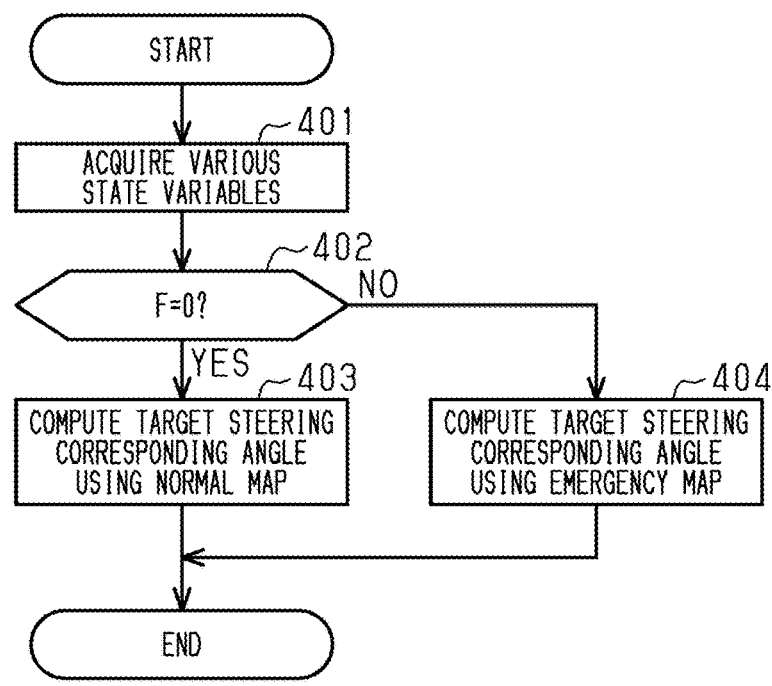
FIG. 7 is a flowchart showing an example of processing procedures for target steering corresponding angle computation by the target steering corresponding angle computation unit in FIG. 2.

Next, an example of processing procedures in which the target steering corresponding angle computation unit 72 computes the target steering corresponding angle θp* will be described in accordance with the flowchart shown in FIG. 7.

Upon acquiring various state quantities (step 401), the target steering corresponding angle computation unit 72 determines whether or not the value of emergency flag F is "0" (step 402). In a case in which the value of the emergency flag F is "0" (YES in step 402), the normal map 81 is used to compute the target steering corresponding angle θp* (step 403).

On the other hand, in a case in which the value of the emergency flag F is "1" (NO in step 402), the target steering corresponding angle computation unit 72 computes the target steering corresponding angle θp* using the emergency map 82 (step 404). The processing of step 404 corresponds to suppressing target steering corresponding value computation processing and emergency adjustment processing.

Next, the functions and effects of the present embodiment will be described.

(1-1) The target operation reaction force computation unit 61, which is a work adjustment unit, executes emergency adjustment processing to adjust the work required to steer the steered wheels 3 in accordance with the results of determining whether an emergency exists. The emergency adjustment processing includes reduction processing for reducing the work in the initial stage after the emergency determination unit 63 has determined that an emergency exists, as compared to a case in which determination is not made that an emergency exists. Accordingly, when determination is made that an emergency exists, the steered wheels 3 can be steered with little work. This facilitates emergency avoidance operations.

(1-2) The reduction processing includes reducing target operation reaction force computation processing for computing the absolute value of the target operation reaction force T* to be smaller as compared to a case in which determination is not made that an emergency exists. Accordingly, executing the reduction processing reduces the force required to operate the operating lever 11, and accordingly the work required to steer the steered wheels 3 is reduced. This facilitates emergency avoidance operations.

(1-3) The reducing target operation reaction force computation processing is processing for reducing the absolute value of the target operation reaction force T* based on the vehicle speed V. Accordingly, in a case in which determination is made that an emergency exists, the operation reaction force can be suitably reduced in accordance with the vehicle speed V.

(1-4) If the operation reaction force is reduced in a case in which determination is made that an emergency exists, the lever tilt angle θl may become too great, which may cause the absolute value of the target steering corresponding angle θp* to become too great. With respect to this point, the emergency adjustment processing further includes the weighting processing in the latter stage after the initial stage, for computing a target operation reaction force T* having an absolute value that is no smaller than the target operation reaction force T* computed in a case in which determination is not made that an emergency exists. That is to say, the operation reaction force becomes great in the latter stage after the initial stage. Accordingly, the lever tilt angle θl can be suppressed from becoming too great. Thus, appropriate emergency avoidance operations can be easily performed.

(1-5) The target operation reaction force computation unit 61 determines that the stage of avoidance by the emergency avoidance operation has transitioned from the initial stage to the latter stage, based on the elapsed time t since determination was made that an emergency exists.

Now, the angle ratio α of the amount of change in the steered angle θi with respect to the amount of change in the lever tilt angle θl may differ depending on the type of vehicle in which the steering system 2 is installed. Accordingly, when the determination of whether or not the state has transitioned from the initial stage to the latter stage is performed based on, for example, the lever tilt angle θl, an optimal threshold value for the lever tilt angle θl needs to be taken into consideration for each vehicle model. With respect to this point, according to the above configuration, the determination as to whether or not the state has transitioned from the initial stage to the latter stage is made based on the elapsed time t after determination is made that an emergency exists. Accordingly, determination can be easily made regarding whether or not transitioning from the initial stage to the latter stage has been performed, for a wide range of vehicle models.

(1-6) If the operation reaction force is reduced in a case in which determination is made that an emergency exists, the lever tilt angle θl may become too great, which may cause the absolute value of the target steering corresponding angle θp* to become too great. With respect to this point, the emergency adjustment processing further includes suppressing target steering corresponding value computation processing for computing the target steering corresponding angle θp* such that the amount of change in the steered angle θi relative to the amount of change in the amount of operation of the operating lever 11 is reduced as compared to a case in which determination is not made that an emergency exists. Accordingly, even when the lever tilt angle θl becomes too great, the absolute value of the target steering corresponding angle θp* can be suppressed from becoming too great. Thus, appropriate emergency avoidance operations can be easily performed.

(1-7) The suppressing target steering corresponding value computation processing is processing for computing the target steering corresponding angle θp* based on the vehicle speed V. Accordingly, in a case in which determination is made that an emergency exists, the target steering corresponding angle θp* can be appropriately computed in accordance with the vehicle speed V.

(1-8) The steering control signal generation unit 73 generates the steering control signal Mt so as to gradually reflect the change in the target steering corresponding angle θp* in the steered angle θi. Thus, sudden changes in the steered angle θi are suppressed, and accordingly irregularity in the behavior of the vehicle can be suppressed.

(1-9) The emergency determination unit 63 determines whether or not the emergency avoidance operation has been completed. The target operation reaction force computation unit 61 and the target steering corresponding angle computation unit 72 stop the emergency adjustment processing after determination is made that the emergency avoidance operation has been completed. Accordingly, a sudden change in the operation reaction force during an emergency avoidance operation, for example, can be prevented. This can keep the driver from feeling uncomfortable.

(1-10) Normally, when an emergency avoidance operation is completed, the lever tilt angle θl of the operating lever 11 is returned to its original position. In light of this point, the emergency determination unit 63 determines whether or not the emergency avoidance operation has been completed based on whether the operating lever 11 is operated in the return direction, which is opposite to the operating direction thereof in the emergency avoidance operation. Accordingly, the emergency avoidance operation can be appropriately determined to have been completed.

(1-11) The emergency determination unit 63 determines whether or not an emergency exists based on the result of performing comparison of magnitude between a parameter indicating a traveling state of the vehicle and a threshold value, and the result of performing comparison of magnitude between a parameter indicating the operation state of the operation unit 4 and a threshold value. Accordingly, whether or not an emergency exists can be appropriately determined, in accordance with the traveling state of the vehicle and the operation state of the operation unit 4.

Second Embodiment

Next, a second embodiment of the steering control device will be described below with reference to the drawings. For convenience of description, the same configurations as those in the first embodiment are denoted by the same signs as those in the first embodiment, and description thereof will be omitted.

Figure 8:
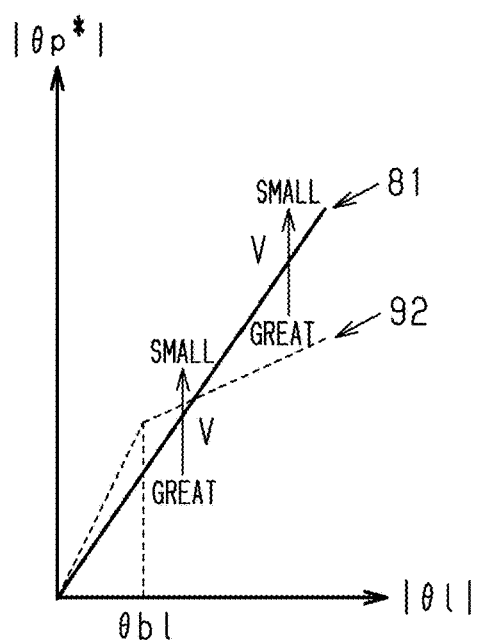
FIG. 8 is a diagram showing an example of a normal map and an emergency map that a target steering corresponding angle computation unit according to a second embodiment has.

As shown in FIG. 8, the memory 72a of the target steering corresponding angle computation unit 72 of the present embodiment stores an emergency map 92 having a form that is different from that of the emergency map 82 according to the first embodiment. Also, the memory 72a stores the normal map 81 according to the first embodiment. In FIG. 8, the normal map 81 is indicated by a continuous line, and the emergency map 92 is indicated by a dashed line.

In each of the normal map 81 and the emergency map 92, a small operation range and a great operation range are set as the range of the lever tilt angle θl. The small operation range is a range of the lever tilt angle θl from zero to a boundary value θlb, and the great operation range is a range of the lever tilt angle θl greater than the boundary value θlb. The boundary value θlb is a lever tilt angle θl at which the steered angle θi becomes great to a certain extent. The boundary value θlb in the present embodiment is, for example, the same as the turning determination threshold value θlth, but may be a value that is greater or a value that is smaller than the turning determination threshold value θ1th. In another embodiment, the boundary value θ1b may be changed based on the vehicle speed V, for example.

In the small operation range, the amount of change in the absolute value of the target steering corresponding angle θp* with respect to the amounts of change in the lever tilt angle θ1 and the vehicle speed V in the emergency map 92 is set to be greater than the amount of change in the absolute value of the target steering corresponding angle θp* with respect to the amounts of change in the lever tilt angle θ1 and the vehicle speed V in the normal map 81. That is to say, in the small operation range, the angle ratio α when determination is made that an emergency exists is greater than the angle ratio α in a case in which determination is not made that an emergency exists. Also, in the great operation range, the amount of change in the absolute value of the target steering corresponding angle θp* with respect to the amounts of change in the lever tilt angle θ1 and the vehicle speed V in the emergency map 92 is set to be smaller than the amount of change in the absolute value of the target steering corresponding angle θp* with respect to the amounts of change in the lever tilt angle θ1 and the vehicle speed V in the normal map 81. That is to say, in the great operation range, the angle ratio α when determination is made that an emergency exists is smaller than the angle ratio α in a case in which determination is not made that an emergency exists.

In the same way as in the first embodiment, in a case in which the value of the emergency flag F is "0", the target steering corresponding angle computation unit 72 computes the target steering corresponding angle θp* by referring to the normal map 81. Also, in a case in which the value of the emergency flag F is "1", the target steering corresponding angle computation unit 72 computes the target steering corresponding angle θp* by referring to the emergency map 92.

Now, referring to the above condition (a2), in a case in which determination is made that an emergency exists, the absolute value of the lever tilt angle θ1 is smaller than the turning determination threshold value θ1th, i.e., smaller than the boundary value θ1b. Accordingly, in the initial stage after determination is made that an emergency exists, even when the amount of change in the lever tilt angle θ1 caused by driver operation is small, the target steering corresponding angle θp* changes greatly.

As described above, the work required for the driver to steer the steered wheels 3 is expressed as the product of the force resisting the operation reaction force and the amount of change in the lever tilt angle θ1. Accordingly, the target steering corresponding angle computation unit 72 reduces the work required to steer the steered wheels 3 by reducing the amount of change in the lever tilt angle θ1 required to turn the steered wheels 3. That is to say, the target steering corresponding angle computation unit 72 corresponds to a work adjustment unit, and executes emergency adjustment processing. The emergency adjustment processing includes reduction processing including reducing target steering corresponding value computation processing.

The processing procedures by which the target steering corresponding angle computation unit 72 computes the target steering corresponding angle θp* are the same as those in the first embodiment described above, and accordingly description thereof will be omitted. Note that, the processing of step 404 executed in a case in which the lever tilt angle θ1 is within the small operation range, i.e., the processing for computing the target steering corresponding angle θp* using the emergency map 92, corresponds to the reduction processing and the reducing target steering corresponding value computation processing.

As described above, after the value of the emergency flag F becomes "1" due to determination being made that an emergency exists, the emergency adjustment processing is executed by computing the target steering corresponding angle θp* using the emergency map 92. This emergency adjustment processing stops when the target steering corresponding angle θp* is computed using the normal map 81, after the value of the emergency flag F becomes "0" as a result of determination that the emergency avoidance operation has been completed.

The present embodiment described above has the following functions and effects in addition to the functions and effects that are similar to the functions and effects described above in (1-1) to (1-11) of the first embodiment.

(2-1) The target steering corresponding angle computation unit 72, which is a work adjustment unit, executes emergency adjustment processing to adjust the work required to steer the steered wheels 3, in accordance with the results of determining whether or not an emergency exists. Accordingly, when determination is made that an emergency exists, the steered wheels 3 can be steered with little work. This facilitates emergency avoidance operations.

(2-2) The reducing processing includes reducing target steering corresponding value computation processing for computing the target steering corresponding angle θp*, such that the amount of change in the steered angle θi relative to the amount of change in the amount of operation of the operating lever 11 is greater as compared to in case in which determination is not made that an emergency exists. Accordingly, by executing the reduction processing, the amount of change in the lever tilt angle θ1 required for the emergency avoidance operation becomes smaller, and the work required to steer the steered wheels 3 becomes smaller. This facilitates emergency avoidance operations.

(2-3) The reducing target steering corresponding value computation processing is processing for computing the target steering corresponding angle θ$p$* based on the vehicle speed V. Accordingly, in a case in which determination is made that an emergency exists, the target steering corresponding angle θp* can be appropriately computed in accordance with the vehicle speed V.

(2-4) Emergency avoidance operations are often necessary when the vehicle is not turning pronouncedly, i.e., when the vehicle is traveling generally straight. With respect to this point, the memory 72$a$ of the target steering corresponding angle computation unit 72 stores the normal map 81 and the emergency map 92 which indicate the relation between the lever tilt angle θ1 and the target steering corresponding angle θp*. Each of the normal map 81 and the emergency map 92 includes the small operation range, which is a range of lever tilt angles θ1 that includes zero, and the great operation range, which is a range of lever tilt angles θ1 of which the absolute value is greater than that of the small operation range. In the small operation range, the amount of change in the absolute value of the target steering corresponding angle θp* relative to the amount of change in the lever tilt angle θ1 in the emergency map 92 is set to be greater than the amount of change in the absolute value of the target steering corresponding angle θp* relative to the amount of change in the lever tilt angle θ1 in the normal map. The reducing target steering corresponding value computation processing is processing for computing a target steering corresponding angle θp* based on the lever tilt angle θ1 by using the emergency map 92. Accordingly, in a case in which determination is made that an emergency exists, the target steering corresponding angle θp* can be computed, with a small computation load, such that the amount of change in the steered angle θi with respect to the amount of change in the amount of operation of the operating lever 11 is greater as compared to when determination is not made that an emergency exists.

(2-5) If the amount of change in the absolute value of the target steering corresponding angle θp* relative to the amount of change in the lever tilt angle θl in the emergency map 92 is increased throughout the entire operating range of the operating lever 11, the absolute value of the target steering corresponding angle θp* may become too great. With respect to this point, in the great operation range, the amount of change in the absolute value of the target steering corresponding angle θp* relative to the amount of change in the lever tilt angle θl in the emergency map 92 is set to be smaller than the amount of change in the absolute value of the target steering corresponding angle θp* relative to the amount of change in the lever tilt angle θl in the normal map. Accordingly, even when the absolute value of the lever tilt angle θl is great, the absolute value of the target steering corresponding angle θp* can be suppressed from becoming too great. Accordingly, appropriate emergency operations can be easily performed.

Each of the above embodiments can be carried out modified as follows. The above embodiments and the following modifications can be combined with each other and carried out insofar as no technical contradiction arises.

Although determination is made that an emergency exists in a case in which all of the above conditions (a1) to (a3) are met, this is not restrictive. For example, an arrangement may be made in which determination is made that an emergency exists in a case in which the conditions (a1) and (a3) are met, without performing determination regarding the condition (a2) regarding the lever tilt angle θl. Also, whether or not an emergency exists may be determined using information other than the parameters indicating the operation state of the operation unit 4 and the parameters indicating the traveling state of the vehicle. Other information may be, for example, a signal from a camera detecting an obstruction. Also, other information may be information obtained through communication with other vehicles traveling nearby or with monitoring equipment installed along the road on which the vehicle is traveling.

Although determination is made that the emergency avoidance operation is completed in a case in which the above condition (b1) is met, this is not restrictive. For example, determination may be made that the emergency avoidance operation is completed in a case in which the vehicle comes to a stop. Also, determination may be made regarding whether or not the emergency avoidance operation is completed using information other than the parameters indicating the operation state of the operation unit 4 and the parameters indicating the traveling state of the vehicle. Other information may be the distance traveled and time traveled since determination is made that an emergency exists. Furthermore, in a case in which a switch to be operated by the driver is provided at the driver's seat, the other information may be an on/off state of this switch.

Although the emergency adjustment processing is stopped in a case in which the emergency determination unit 63 determines that the emergency avoidance operation is completed, this is not restrictive. For example, the emergency adjustment processing may be stopped in a case in which at least one of the conditions (a1) to (a3) is not met. That is to say, for example, in a case in which at least one of the conditions (a1) to (a3) is not met, the value of the emergency flag F may be reset to "0." In this case, the emergency determination unit 63 does not have to execute the completion determination.

In the second embodiment, the amount of change in the absolute value of the target steering corresponding angle θp* relative to the amount of change in the lever tilt angle θl in the emergency map 92 may be greater than that in the normal map 81, in the great operation range as well. Also, the emergency map 92 may be set such that the absolute value of the target steering corresponding angle θp* does not change even when the absolute value of the lever tilt angle θl increases in the great operation range. That is to say, in a case in which determination is made that an emergency exists, the target steering corresponding angle θp* when the lever tilt angle θl is a boundary value may be set as an upper limit angle, such that the steered wheels 3 are not steered any further. Note that in this case as well, after determination is made that the emergency avoidance operation is completed, the steered wheels 3 can be steered to an angle no smaller than the upper limit angle.

A dead band may be set in the normal map 81 and the emergency maps 82 and 92. Specifically, a range may be set near zero degrees of the lever tilt angle θl, in which the target steering corresponding angle θp* remains at zero degrees even when the absolute value of the lever inclination angle θl increases. Also, the normal map 81 and the emergency maps 82 and 92 may be two-dimensional maps showing the relation of the target steering corresponding angle θp* as to the lever tilt angle θl. That is to say, the suppressing target steering corresponding value computation processing and the reducing target steering corresponding value computation processing may be processing in which the target steering corresponding angle θp* is computed without using the vehicle speed V. Further, the normal computation information and the emergency computation information may be, for example, a function expression instead of a map.

In the above second embodiment, the reduction processing by the target steering corresponding angle computation unit 72 may compute the target steering corresponding angle θp* such that the amount of change in the steered angle θi relative to the amount of change in the lever tilt angle θl is greater as compared to a case in which determination is not made that an emergency exists, regardless of the absolute value of the lever tilt angle θl.

The steering control signal generation unit 73 is equipped with a guard processing unit 75, and generates the steering control signal Mt that gradually reflects the change in the target steering corresponding angle θp* in the steered angle θi, by setting the steering speed of the steered wheels 3 to be no greater than the upper limit speed. However, this is not restrictive, and the steering control signal generation unit 73 may be provided with a filter processing unit that executes, for example, first-order lag filtering processing in addition to or instead of the guard processing unit 75. In this case, the filter processing unit executes the first-order lag filtering processing with respect to the difference Δθp that is input, thereby suppressing sudden change in the difference Δθp. Thus, the change in the target steering corresponding angle θp* is gradually reflected in the steered angle θi. Note that a time constant and so forth of the filter may be changed based on the vehicle speed V.

The steering control signal generation unit 73 has been described as constantly generating the steering control signal Mt so as to gradually reflect the change in the target steering corresponding angle θp* in the steered angle θi. However, this is not restrictive, and the steering control signal Mt may be generated so as to gradually reflect the change in the target steering corresponding angle θp* in the steered angle θi only in a case of switching between the normal map 81 and the emergency maps 82, 92, for example. In this case, the steering control signal Mt may be generated such that the difference Δθp caused by switching the maps disappears within a gradual change time that is set in advance. Note that the gradual change time may be computed based on the vehicle speed V.

Further, the steering control signal generation unit 73 may not be provided with the guard processing unit 75, and may generate the steering control signal Mt such that change in the target steering corresponding angle θp* is immediately reflected in the steered angle θi.

The target operation reaction force computation unit 61 has been described as computing the angular axial force as the basic operation reaction force Tb, but this is not restrictive, and a current axial force, for example, may be computed as the basic operation reaction force Tb. The current axial force is the axial force actually transmitted from the steering motor 32 to the rack shaft 22, and includes road surface information. The current axial force can be computed based on the actual current value supplied to the steering motor 32. Also, a distributed axial force obtained by adding the angular axial force and the current axial force together at a predetermined ratio may be computed as the basic operation reaction force Tb. Further, for example, a value proportional to the absolute value of the lever tilt angle θl may be computed as the basic operation reaction force Tb, and the computation of the basic operation reaction force Tb can be changed as appropriate.

The target operation reaction force computation unit 61 has been described as computing the initial gain Gi based on the vehicle speed V, but this is not restrictive, and the initial gain Gi may be a fixed value that is set in advance. Similarly, the latter gain Gl may be a fixed value that is set in advance.

The target operation reaction force computation unit 61 has been described as adjusting the basic operation reaction force Tb by multiplying the basic operation reaction force Tb by the gain G, but this is not restrictive, and the method of adjusting the basic operation reaction force Tb can be changed as appropriate. For example, the basic operation reaction force Tb may be adjusted by subtracting an adjustment value from the absolute value of the basic operation reaction force Tb. The adjustment value may be a fixed value that is set in advance, or a value that is computed based on the vehicle speed V.

Also, the target operation reaction force computation unit 61 may have normal computation information and emergency computation information indicating the relation between the lever tilt angle θl and the target operation reaction force T*, for example. In this case, the target operation reaction force T* in the emergency computation information can be set to be greater than the target operation reaction force T* in the normal computation information. In this case, the target operation reaction force computation unit 61 can directly compute the target operation reaction force T* without computing the basic operation reaction force Tb.

Although description has been made that determination of transition of the avoidance stage by the emergency avoidance operation from the initial stage to the latter stage is based on the elapsed time t since determination is made that an emergency exists, this is not restrictive. For example, determination may be made that the avoidance stage has transitioned from the initial stage to the latter stage based on the amount of change in the lever tilt angle θl after determination is made that an emergency exists.

Emergency adjustment processing does not have to include weighting processing. In other words, the operation reaction force may remain small after determination is made that an emergency exists.

In the first embodiment, the emergency adjustment processing does not have to include the suppressing target steering corresponding value computation processing. That is to say, the target steering corresponding angle θp* may be computed in the same way in both cases of when determination is made that an emergency exists and when determination is not made that an emergency exists.

In the second embodiment, the emergency adjustment processing does not have to include the reduction processing, the reducing target operation reaction force computation processing, and the weighting processing, performed by the target operation reaction force computation unit 61. That is to say, the target operation reaction force T* may be computed in the same way in both a case in which determination is made that an emergency exists and when determination is not made that an emergency exists.

The convertible value that can be converted into the steered angle θi of the steered wheels 3 has been described as being the rotational angle of the pinion shaft 21, but this is not restrictive, and for example, a stroke amount of the rack shaft 22, or the steered angle θi itself, may be the convertible value.

The microcomputer 51 does not have to notify the driver that an emergency exists via the notification unit 37.

Although the operating lever 11 has been described as being tiltably supported by the base 12, this is not restrictive, and may be supported slidably relative to the base 12, for example. In this case, the amount of operation by the driver is represented by the amount of sliding of the operating lever 11. In addition to controlling the steered angle θi of the steered wheels 3, the operating lever 11 may be used to control driving/braking of the vehicle.

Although the lever tilt angle θl has been described as being detected by the tilt angle sensor 13, this is not restrictive, and for example, the lever tilt angle θl may be detected based on the rotation angle of the operating motor 16. In this case, the operation unit 4 does not have to include the tilt angle sensor 13.

The operation unit 4 may include a steering wheel as the operating member instead of the operating lever 11. Also, the operation unit 4 may include, in addition to the operating lever 11, a steering wheel operated by the driver. The steering system 2 has a linkless structure in which the power transmission between the operation unit 4 and the steering unit 5 is separated, but this is not restrictive. In a case in which a steering wheel is provided, the steering system 2 may have a structure such that the power transmission between the operation unit 4 and the steering unit 5 can be separated by a clutch.

Although the steering actuator 31 has been described as transmitting the rotation of the steering motor 32 to the ball screw mechanism 35 via the belt mechanism 34, this is not restrictive, and for example, the steering actuator 31 may be configured such that the rotation of the steering motor 32 is transmitted to the ball screw mechanism 35 via a gear mechanism. Also, the steering actuator 31 may be configured such that the steering motor 32 directly rotates the ball screw mechanism 35. Further, the steering unit 5 may be configured including a second rack and pinion mechanism, and the steering actuator 31 may be configured to apply a steering force to the steering unit 5 by converting rotation of the steering motor 32 into a reciprocating motion of the rack shaft 22 by the second rack and pinion mechanism.

The invention claimed is:

1. A steering control device that controls a steering system of a vehicle, the steering system having a structure in which a power transmission path between an operation unit including an operating member and a steering unit configured to steer a steered wheel is mechanically separated, the steering control device comprising:
    a target steering corresponding value computation unit configured to compute a target steering corresponding value that is a target value of a convertible value that can be converted into a steered angle of the steered wheel, based on an amount of operation of the operating member;
    a steering control signal generation unit configured to generate, based on the target steering corresponding value, a steering control signal for actuation of the steering unit;
    an emergency determination unit configured to determine whether or not an emergency exists in which an emergency avoidance operation is to be performed; and
    a work adjustment unit configured to adjust work of a driver required to steer the steered wheels, wherein
    the work adjustment unit is configured to execute emergency adjustment processing for adjusting the work in accordance with a determination result of whether or not an emergency exists,
    the emergency adjustment processing includes reduction processing for reducing the work in an initial stage after the emergency determination unit has determined that an emergency exists, as compared to a case in which determination is not made that an emergency exists,
    the operation unit is configured to apply, to the operating member, an operation reaction force in accordance with the amount of operation,
    the steering control device further includes:
        a target operation reaction force computation unit configured to compute a target operation reaction force, which is a target value of the operation reaction force, based on the amount of operation; and
        an operation control signal generation unit configured to generate, based on the target operation reaction force, an operation control signal for actuation of the operation unit,
    the work adjustment unit includes the target operation reaction force computation unit,
    the reduction processing includes reducing target operation reaction force computation processing for computing the target operation reaction force having a smaller absolute value as compared to in a case in which determination is not made that an emergency exists, and
    the emergency adjustment processing further includes weighting processing for computing, in a latter stage following the initial stage, the target operation reaction force having an absolute value greater than the target operation reaction force computed in the initial stage.

2. The steering control device according to claim 1, wherein the reducing target operation reaction force computation processing is processing for computing the target operation reaction force based on a vehicle speed.

3. The steering control device according to claim 1, wherein the target operation reaction force computation unit is configured to determine that a stage of avoidance by the emergency avoidance operation has shifted from the initial stage to the latter stage, based on elapsed time since determination was made that an emergency exists.

4. The steering control device according to claim 1, wherein
    the work adjustment unit further includes the target steering corresponding value computation unit, and
    the emergency adjustment processing further includes suppressing target steering corresponding value computation processing for computing the target steering corresponding value such that an amount of change in the steered angle with respect to an amount of change in the amount of operation is smaller as compared to a case in which determination is not made that an emergency exists.

5. The steering control device according to claim 1, wherein
    the work adjustment unit includes the target steering corresponding value computation unit, and
    the reduction processing includes reducing target steering corresponding value computation processing for computing the target steering corresponding value such that an amount of change in the steered angle as to an amount of change in the amount of operation is greater as compared to a case in which determination is not made that an emergency exists.

6. The steering control device according to claim 5, wherein the reducing target steering corresponding value computation processing is processing for computing the target steering corresponding value based on a vehicle speed.

7. The steering control device according to claim 5, wherein
    the target steering corresponding value computation unit includes memory,
    the memory stores normal computation information and emergency computation information, indicating a relation between the amount of operation and the target steering corresponding value,
    the amount of operation is zero in a case in which the vehicle travels straight,
    each of the normal computation information and the emergency computation information includes a small operation range that is a range of the amount of operation including zero, and a great operation range that is a range of the amount of operation having an absolute value greater than that of the small operation range,
    in the small operation range, an amount of change of an absolute value of the target steering corresponding value with respect to an amount of change of the amount of operation in the emergency computation information is set to be greater than that in the normal computation information, and the reducing target steering corresponding value computation processing is processing for computing the target steering corresponding value based on the amount of operation by using the emergency computation information.

8. The steering control device according to claim 1, wherein the steering control signal generation unit is configured to generate the steering control signal that gradually reflects a change in the target steering corresponding value in the steered angle.

9. The steering control device according to claim 1, wherein
the emergency determination unit is further configured to determine whether or not an emergency avoidance operation is completed, and
the work adjustment unit is configured to stop the emergency adjustment processing after the emergency determination unit determines that the emergency avoidance operation is completed.

10. The steering control device according to claim 9, wherein the emergency determination unit is configured to determine whether or not an emergency avoidance operation has been completed based on whether or not an operation is performed in a return direction opposite to an operation direction of the operating member due to the emergency avoidance operation.

11. The steering control device according to claim 1, wherein the emergency determination unit is configured to determine whether or not an emergency exists based on a result of comparison in magnitude between a parameter indicating a traveling state of the vehicle with a threshold value, and a result of comparison in magnitude between a parameter indicating an operation state of the operation unit with a threshold value.

12. A steering control device that controls a steering system of a vehicle, the steering system having a structure in which a power transmission path between an operation unit including an operating member and a steering unit configured to steer a steered wheel is mechanically separated, the steering control device comprising:
a target steering corresponding value computation unit configured to compute a target steering corresponding value that is a target value of a convertible value that can be converted into a steered angle of the steered wheel, based on an amount of operation of the operating member;
a steering control signal generation unit configured to generate, based on the target steering corresponding value, a steering control signal for actuation of the steering unit;
an emergency determination unit configured to determine whether or not an emergency exists in which an emergency avoidance operation is to be performed; and
a work adjustment unit configured to adjust work of a driver required to steer the steered wheels, wherein
the work adjustment unit is configured to execute emergency adjustment processing for adjusting the work in accordance with a determination result of whether or not an emergency exists,
the emergency adjustment processing includes reduction processing for reducing the work in an initial stage after the emergency determination unit has determined that an emergency exists, as compared to a case in which determination is not made that an emergency exists, the operation unit is configured to apply, to the operating member, an operation reaction force in accordance with the amount of operation,
the steering control device further includes:
a target operation reaction force computation unit configured to compute a target operation reaction force, which is a target value of the operation reaction force, based on the amount of operation; and
an operation control signal generation unit configured to generate, based on the target operation reaction force, an operation control signal for actuation of the operation unit,
the work adjustment unit includes the target operation reaction force computation unit,
the reduction processing includes reducing target operation reaction force computation processing for computing the target operation reaction force having a smaller absolute value as compared to in a case in which determination is not made that an emergency exists,
the work adjustment unit further includes the target steering corresponding value computation unit, and
the emergency adjustment processing further includes suppressing target steering corresponding value computation processing for computing the target steering corresponding value such that an amount of change in the steered angle with respect to an amount of change in the amount of operation is smaller as compared to a case in which determination is not made that an emergency exists.

13. The steering control device according to claim 12, wherein the reducing target operation reaction force computation processing is processing for computing the target operation reaction force based on a vehicle speed.

14. The steering control device according to claim 12, wherein the emergency adjustment processing further includes weighting processing for computing, in a latter stage following the initial stage, the target operation reaction force having an absolute value no smaller than the target operation reaction force computed in a case in which determination is not made that an emergency exists.

15. The steering control device according to claim 12, wherein the suppressing target steering corresponding value computation processing is processing for computing the target steering corresponding value based on a vehicle speed.

16. The steering control device according to claim 12, wherein the steering control signal generation unit is configured to generate the steering control signal that gradually reflects a change in the target steering corresponding value in the steered angle.

17. The steering control device according to claim 12, wherein
the emergency determination unit is further configured to determine whether or not an emergency avoidance operation is completed, and
the work adjustment unit is configured to stop the emergency adjustment processing after the emergency determination unit determines that the emergency avoidance operation is completed.

18. The steering control device according to claim 17, wherein the emergency determination unit is configured to determine whether or not an emergency avoidance operation has been completed based on whether or not an operation is performed in a return direction opposite to an operation direction of the operating member due to the emergency avoidance operation.

19. The steering control device according to claim 12, wherein the emergency determination unit is configured to determine whether or not an emergency exists based on a result of comparison in magnitude between a parameter indicating a traveling state of the vehicle with a threshold value, and a result of comparison in magnitude between a parameter indicating an operation state of the operation unit with a threshold value.

20. A steering control method for controlling a steering system of a vehicle, the steering system having a structure in which a power transmission path between an operation unit including an operating member and a steering unit configured to steer a steered wheel is mechanically separated, the steering control method comprising:
computing a target steering corresponding value that is a target value of a convertible value that can be converted into a steered angle of the steered wheel, based on an amount of operation of the operating member;
generating, based on the target steering corresponding value, a steering control signal for actuation of the steering unit;
determining whether or not an emergency exists in which an emergency avoidance operation is to be performed; and
adjusting work of a driver required to steer the steered wheels, wherein
adjusting the work includes executing emergency adjustment processing for adjusting the work in accordance with a determination result of whether or not an emergency exists,
the emergency adjustment processing includes reduction processing for reducing the work in an initial stage after determination is made that an emergency exists, as compared to a case in which determination is not made that an emergency exists,
the operation unit is configured to apply, to the operating member, an operation reaction force in accordance with the amount of operation,
the steering control method further includes
computing a target operation reaction force, which is a target value of the operation reaction force, based on the amount of operation, and
generating an operation control signal for actuation of the operation unit based on the target operation reaction force,
adjusting the work includes computing the target operation reaction force,
the reduction processing includes reducing target operation reaction force computation processing for computing the target operation reaction force having a smaller absolute value as compared to in a case in which determination is not made that an emergency exists, and
the emergency adjustment processing further includes weighting processing for computing, in a latter stage following the initial stage, the target operation reaction force having an absolute value greater than the target operation reaction force computed in the initial stage.

* * * * *